Nov. 10, 1942.    R. R. RIDGWAY    2,301,706
METHOD OF PURIFYING CRYSTALLINE ALUMINA AND
AN ABRASIVE MATERIAL MADE THEREBY
Filed Nov. 2, 1939
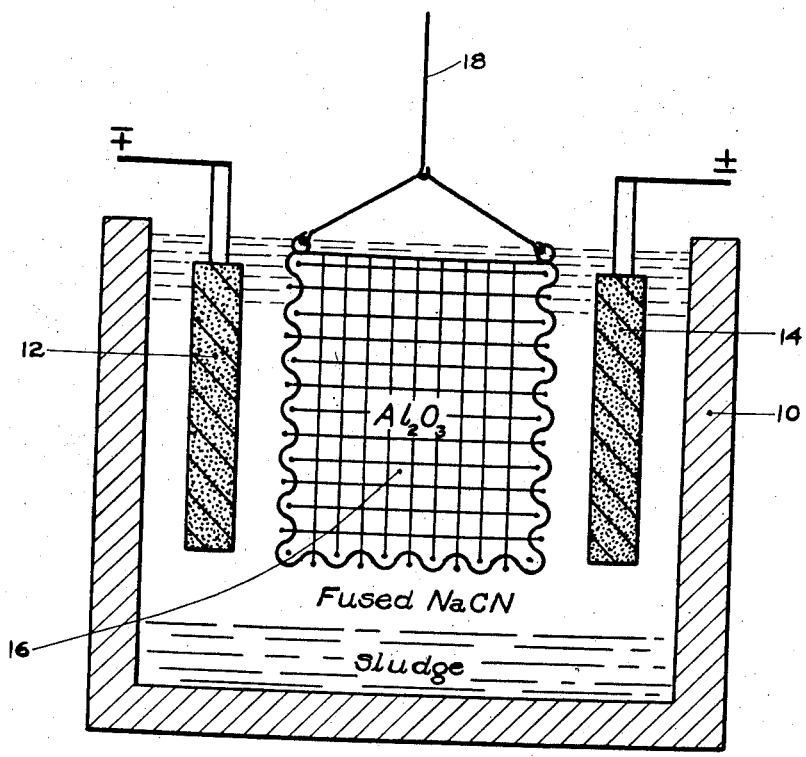
Inventor
Raymond R. Ridgway
By Clayton L. Jenks
Attorney
Witness: Charles H. Amidon.

Patented Nov. 10, 1942

2,301,706

UNITED STATES PATENT OFFICE 2,301,706

METHOD OF PURIFYING CRYSTALLINE ALUMINA AND AN ABRASIVE MATERIAL MADE THEREBY

Raymond R. Ridgway, Niagara Falls, N. Y., assignor to Norton Company, Worcester, Mass., a corporation of Massachusetts Application November 2, 1939, Serial No. 302,485

9 Claims. (Cl. 23—142)

This invention relates to the purification of crystalline alumina and more particularly to the treatment of crystalline alumina as derived by the electric furnace purification of bauxite and other minerals containing alumina.

The mineral bauxite obtained from one source may contain only about 80% of alumina, together with titania, zirconia, silica, iron oxide and the alkali metal and alkaline earth metal oxides as impurities. This material is customarily fused in an electric furnace under conditions and with reagents which tend to purify the material, but the product still contains impurities as a slag that is present in the interstices between the crystals of the alumina. A standard purified crystalline alumina may analyze as follows:

|  | Example A | Example B |
|---|---|---|
|  | Percent by weight |  |
| Alumina | 96.5 | 94.0 |
| Titania | 1.5 | 3.0 |
| Zirconia | 0.2 | 0.4 |
| Silica | 0.5 | 2.0 |
| Iron oxide | 0.2 | 0.2 |
| Alkaline metal oxide | 1.1 | 0.4 |

The alumina crystal has a hardness of 9 on Moh's scale, but the slag constituents are comparatively soft and fragile and so materially affect the abrasive properties of the alumina crystals when used in a grinding wheel. Many methods have been proposed and used for the purification of such crystalline alumina. One has involved a second expensive furnacing step for the further reduction of the impurities. Another has required chemical purification of the alumina before melting and crystallizing it. Each procedure has had objectionable characteristics, such as the expense involved or the loss of the alumina itself.

The primary object of this invention is to provide a method of purifying alumina after it has been crystallized which is economical and efficient and which does not result in a material loss of the valuable crystalline alumina itself.

Another object is to provide a novel and useful abrasive material. Further objects will be apparent in the following disclosure.

I have discovered that fused alkali metal cyanides will dissolve acidic slag constituents ordinarily associated with crystalline alumina, as made by standard electric furnace methods, without attacking the crystals to a serious extent. Hence, in accordance with this invention, I propose to treat crystalline alumina, which contains as a separate phase an intercrystalline glass or slag of impurities, with fused alkali metal cyanide, and particularly sodium or potassium cyanide, which is capable of dissolving silica, titania, iron oxide and other impurities, and thus disintegrate the slag and remove it from the crystal without dissolving the alumina or detrimentally affecting the crystal structure. The alumina crystals are preferably treated in substantially their final granular size, or oversized if desired. The temperature of the bath is maintained at or above its melting point and preferably at that high temperature at which the alkali metal cyanide readily dissolves or reacts with the titanium oxide, silicon oxide and other impurities and so disintegrates the slag. The solvent action of the reagent and the temperature of the bath may be controlled by the addition of other salts, such as sodium chloride.

While various types of apparatus may be employed for my purpose, I prefer to use that illustrated in the drawing, which is a diagrammatic sectional view of the apparatus.

The apparatus illustrated comprises a container 10 of iron or other suitable material which is not readily attacked by the sodium cyanide which is preferably used. This container for the reagent may be heated by an external source of heat but preferably by means of two carbon electrodes 12 and 14 which project into the bath 16. An alternating current of suitable voltage and amperage is passed through the cyanide by means of these electrodes and thus serves to maintain the required temperature. If desired, an induction type of furnace may be employed in which the material is heated by induction currents set up in the iron container and the bath. The sodium cyanide is held at a temperature above its melting point and preferably between 575 and 900° C., so that this superheated material will readily attack the slag constituents of the alumina grain. An iron wire basket 16, or a basket made of sheet iron provided with holes for the passage of the liquid, is provided. It is arranged to be dipped into the bath by means of the cable support 18. The crystals of impure alumina are placed in this basket and the basket lowered until the crystals are fully immersed in the fused sodium cyanide. The crystalline alumina is first ordinarily crushed to a size not greater than ¼ inch in diameter, and it is preferably crushed to the size at which it will be later used or to a slightly larger size owing to the grains being reduced in size somewhat by this treatment. The alumina grain is left in the cyanide bath for a sufficient time to effect the required solution of the slag ingredients. If desired, the bath may be stirred either by means of a metal stirring apparatus, or by means of an electric induction current set up in the material.

The superheated sodium cyanide attacks and dissolves the soluble constituents of the glass or slag located in the interstices between the alumina crystals. Since the alumina crystal is not attacked, any material, such as titania, which is in solid solution within the crystal, remains therein at the end of the purification process. The impurities in the external slag or glass phase are partially dissolved and the rest of the slag is disintegrated and freed from the crystal as a sludge which separates and drops to the bottom of the container. That is, enough of the slag constituents are dissolved to cause disintegration of most of the slag and permit the other constituents which are not readily dissolved to be easily separated from association with the crystalline alumina.

After the alumina has been treated to a sufficient extent, the basket containing the same is withdrawn from the cyanide solution containing the sludge and dissolved impurities, and suitable procedure is then adopted for removing the excess of cyanide. For example, the basket containing the grain may be placed in a centrifugal separator and the excess of fused cyanide thrown from the crystals while they are still hot, thus saving the reagent for further use. The alumina crystals are then washed in water or any other solvent for the sodium cyanide so as to remove the reagent. Other suitable procedure may be adopted to aid in the purification step. Also, the sodium cyanide bath may be suitably treated to remove the sludge and dissolved compounds, so that it may be reused.

Various reagent compositions may be employed for the purpose. I may use the standard reagents on the market which are employed for case hardening steels and for other purposes. A commercial grade of sodium cyanide averaging at least 96% NaCN has a melting point of 560° C. and may be used satisfactorily at temperatures between 575° C. and 900° C. and preferably at a temperature of about 650° C. The solvent action of the reagent and the temperature of the bath may be varied by the inclusion of a suitable salt, such as sodium chloride. For example, a mixture of about 75% of NaCN, 15% of NaCl and 10% of $Na_2CO_3$ has a melting point of about 590° C. A composition containing about 45% NaCN, 45% NaCl and 10% $Na_2CO_3$ melts at about 675° C. Another containing about 30% NaCN, from 25 to 30% NaCl and not over 45% $Na_2CO_3$ melts at about 625° C. These various compositions and many others may be employed for purifying crystalline alumina according to my invention.

It is believed that the iron oxide is dissolved to form a ferro-cyanide which breaks down to regenerate sodium carbonate. Consequently, the sodium carbonate content of the melt gradually increases. This results in a decrease of the selective action of the fused bath for the slag only, since sodium carbonate is a solvent for the crystalline alumina. Hence, it is desirable to keep the carbonate content below that point at which a material amount of the alumina is dissolved. The relative proportions of sodium cyanide and the other bath constituents may be controlled by a periodic purification of the bath or by the addition of cyanide reagent. Any suitable chemical procedure may be employed for regenerating the cyanide bath or for extracting the impurities therefrom.

It will thus be seen that, in accordance with this invention, I have provided a simple and comparatively economical method for removing the glassy or slag constituents that are present as veins in the crevices and parting planes between the alumina crystals. Owing to the removal of the slag constituents adhering originally to the surface of the grain, the grain is thus left in what may be considered a pitted condition, in that it is provided with pits and grooves or other irregular surfaces which aid in the holding power of the grain. The crystalline alumina is not etched or dissolved to any material extent by this treatment. Hence, a band, such as glue or a resinoid or rubber, will adhere more firmly to the cleaned and pitted surface of the abrasive grain. This results in a stronger bonded article than heretofore obtained where the bond adhered in part to the comparatively fragile slag which adhered only weakly to the grain.

The product as thus made consists of particles of crystalline alumina containing in solid solution from 0.2% to 1.5% by weight of titania and from 0 to 0.5% by weight of iron oxide calculated as $Fe_2O_3$. The crystal is particularly characterized by a rough surface and a porous structure caused by the slag being dissolved out of the fissures and veins between the alumina crystals. That is, the solids represented by the slag impurities have been replaced by gaps and voids which exist largely between the crystals and are not within the structure of the individual crystals. Hence, the abrasive is more brittle than is the crystal containing the slag, and it is able to break down more readily and so present renewed sharpened edges and corners during a grinding operation. Moreover, the fissures and gaps as well as the roughened surface of the crystal present interlocking portions into which glue and other types of bonds may penetrate. This provides for a stronger adherence of the bond to the crystal than is the case with the slag containing substance. Also, the ingredients in solid solution in the alumina have a marked effect on the properties of the crystal and so give it different abrading characteristics from those which a more pure alumina crystal would have. Hence, the material presents many characteristics and advantages not inherent in abrasive materials as heretofore produced.

It will now be appreciated that various modifications may be made in this procedure to accomplish the desired end and that the process and apparatus as described are to be considered merely as illustrating the general principles and a preferred method and apparatus for carrying out the purification step. Also, the abrasive material may vary widely in the chemical composition and physical structure, depending upon the nature and source of the raw material. Hence, the above description is not to be considered as a limitation upon the invention except as it is defined in the appended claims.

I claim:

1. The method of purifying crystalline alumina which is contaminated with exterior slag constituents which comprises treating the material with a fused alkali metal cyanide and dissolving a considerable portion of said constituents and thereafter recovering the crystalline alumina.

2. The method of treating impure crystalline alumina having a slag adhering thereto comprising the steps of crushing the alumina to a small grit size and then immersing the material in fused alkali metal cyanide and holding it there for a sufficient time to permit the disintegration and the solution of the major portion of the slag and thereafter separating the alumina crystals from the bath and slag constituents.

3. The method of purifying crystalline alumina containing slag constituents adhering thereto comprising the steps of treating the material with alkali metal cyanide heated to a temperature above its melting point and dissolving and disintegrating the slag and thereafter separating the crystals from the slag constituent.

4. The method of treating impure crystalline alumina comprising the steps of crushing it to substantially its final grit size, then immersing the grain in fused and super-heated alkali metal cyanide to cause solution and disintegration of the slag and its separation from the crystals, and thereafter removing the alumina crystals and separating them from the bath constituents.

5. The method of treating impure alumina crystals comprising the step of treating the same with fused alkali metal cyanide at a temperature between its melting point and 900° C. and thereby causing disintegration and solution of the slag constituents and thereafter removing the alumina crystals from the bath and residue and washing the same.

6. The method of treating impure alumina crystals comprising the steps of crushing it to substantially its final grit size, immersing the same in fused alkali metal cyanide while electrically heating the material to a temperature between 750 and 900° C., and causing solution and disintegration of the slag constituents and separation from the alumina crystals.

7. The method of treating impure alumina crystals having acidic slag constituents adhering thereto comprising the steps of crushing the crystalline material to substantially its final grit size, then immersing the same in alkali metal cyanide while the latter is maintained at a temperature between its melting point and 900° C. and causing solution and disintegration of the slag constituents, then separating the alumina crystals from the solution and slag constituents and washing the crystals to remove the excess of metal cyanide therefrom.

8. The method of treating crystalline alumina contaminated with an external phase of slag impurities comprising the steps of treating the material with sodium cyanide containing a salt which modifies the melting point of the bath, while maintaining the temperature of the bath above said melting point and below 900° C., and thereafter separating the alumina crystals from the bath constituents.

9. The method of treating crystalline alumina containing an external phase of slag impurities comprising the steps of immersing the crystalline alumina in granular form in a fused bath of sodium cyanide containing sodium chloride, maintaining the temperature of the bath above the melting point of the mixture but below 900° C. and thereafter removing the alumina crystals from the constituents of said bath.

RAYMOND R. RIDGWAY.